US009056670B1

(12) United States Patent
Ruiz et al.

(10) Patent No.: US 9,056,670 B1
(45) Date of Patent: Jun. 16, 2015

(54) HYBRID (PITOT-FLUSH) AIR INTAKE SYSTEM FOR AIR-BREATHING MISSILES AND AIRCRAFT

(75) Inventors: Carlos G. Ruiz, Orlando, FL (US); Glenn A. Gebert, Ocoee, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1948 days.

(21) Appl. No.: 11/948,046

(22) Filed: Nov. 30, 2007

Related U.S. Application Data

(60) Provisional application No. 60/868,014, filed on Nov. 30, 2006.

(51) Int. Cl.
*B64D 33/02* (2006.01)
*B64C 21/02* (2006.01)

(52) U.S. Cl.
CPC ...................................... *B64C 21/02* (2013.01)

(58) Field of Classification Search
None
See application file for complete search history.

(56) References Cited

U.S. PATENT DOCUMENTS

| 3,027,711 | A | * | 4/1962 | Rae ................................. 244/74 |
| 4,121,606 | A | * | 10/1978 | Holland et al. .............. 137/15.1 |
| 6,293,494 | B1 | * | 9/2001 | Scherer et al. ............... 244/53 B |
| 6,575,406 | B2 | * | 6/2003 | Nelson .......................... 244/119 |
| 6,634,595 | B2 | * | 10/2003 | Koncsek et al. ............ 244/53 B |
| 6,901,737 | B2 | * | 6/2005 | Schnoor ....................... 60/39.83 |
| 7,014,145 | B2 | * | 3/2006 | Bagnall ....................... 244/53 B |
| 2010/0019101 | A1 | * | 1/2010 | Smith et al. ................. 244/53 B |

OTHER PUBLICATIONS

Blaize, Michael et al., "Automated Optimal Design of Two Dimensional High Speed Missile Inlets", *AIAA, Aerospace Sciences Meeting & Exhibit, 36th* Reno, Nevada Jan. 12-15, 1998 , 1-22.
Bourdeau, Christophe et al., "Performance Analysis for an Automated Optimal Design of High Speed Missile Inlets", *37th AIAA Aerospace Sciences Meeting and Exhibit* Reno, Nevada Jan. 11-14, 1999 , 1-9.
Jung, Yong W. et al., "Conceptual Design for the Air Intake System of Smart UAV", *43rd AIAA Aerospace Sciences Meeting and Exhibit* Reno, Nevada Jan. 1-13, 2005 , 1-10.
Lee, Byung J. et al., "Optimal Shape Design of the S-Shaped Subsonic Intake Using NURBS", *Department of Mechanical & Aerospace Engineering, Seoul National University* Seoul 151-742, Korea, 1-3.
Leynaert, J. et al., "Fundamentals of Fighter Aircraft Design: Engine Intake and Afterbody", *AGARD, Special Course on Fundamentals of Fighter Aircraft Design* AEO Cambridge Scientific , 1-39.
Li, Q. et al., "Design and Performance of S-Shaped Inlet for High Subsonic Missiles", *Journal of Nanjing University of Aeronautics & Astronautics* vol. 34, No. 2 Apr. 2002 , 1-6.
Llang, Dewang et al., "Design and Calculation of Performance of a Subsonic Inlet Duet", *Journal of Propulsion Technology* Feb. 1992 , 14-18.

(Continued)

*Primary Examiner* — Tien Dinh
*Assistant Examiner* — Michael Wang
(74) *Attorney, Agent, or Firm* — Withrow & Terranova, PLLC

(57) ABSTRACT

A hybrid air intake system and method for air-breathing missiles and aircraft comprising providing to an airborne vehicle fuselage an air intake opening comprising at least a pair of side walls and at least an upper wall and a lower wall extending between the side walls, wherein the lower wall extends below a plane defined by the vehicle fuselage, and not employing a boundary layer diverter between the fuselage and the upper wall.

12 Claims, 7 Drawing Sheets

(56) References Cited

OTHER PUBLICATIONS

Luidens, R. W. et al., "An Approach to Optimum Subsonic Inlet Design", *American Society of Mechanical Engineers, Gas Turbine Conference and Exhibit and Solar Energy Conference* San Diego, Calif. Mar. 12-15, 1979 , 1-9.

Moore, M. E. et al., "Preliminary Design Aerodynamics of Missile Inlets", *8th AIAA Applied Aerodynamics Conference; American Institute of Aeronautics and Astronautics* Portland, Oregon; Washington, D.C. Aug. 20-22, 1990 , 664-678.

Re, Richard J. et al., "A Wind Tunnel Investigation of Three NACA 1-Series Inlets at Mach Numbers Up to 0.92", *National Aeronautics and Space Administration, Langley Research Center* Hampton, Virginia 23681-0001 Nov. 1996 , 1-182.

\* cited by examiner

HYBRID (PITOT-FLUSH) AIR INTAKE SYSTEM FOR AIR-BREATHING MISSILES AND AIRCRAFT

CROSS-REFERENCE TO RELATED APPLICATIONS

This application claims priority to and the benefit of the filing of U.S. Provisional Patent Application Ser. No. 60/868,014, entitled "Air Intake System for Airborne Vehicles", filed on Nov. 30, 2006, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to air intake systems for air-breathing missiles, aircraft, and the like.

2. Description of Related Art

Volume constraints inside an air breathing missile or aircraft, combined with high inlet performance demands (i.e., high levels of total pressure recoveries and low distortion levels at the engine face) makes the integration and packaging of an air induction system a challenging problem. Significant compromises on inlet performance, and therefore on vehicle performance, are frequently made. It can be shown, both mathematically and experimentally, that engine thrust is directly proportional to inlet total pressure recovery.

Air breathing engines require flow from an inlet that minimizes losses and fits within the volume or packaging constraints. The size of the inlet capture and throat areas is dictated by the amount of air the engine, such as a turbojet, a turbofan or an auxiliary power unit, requires. Inlet capture and throat area requirements often compete with both internal and external physical and geometric constraints. Virtually all air-breathing missiles or aircraft work to these design constraints.

There are basically two types of prior art high performance subsonic inlets for missiles and aircraft, a pitot (or scoop) inlet, and a flush (or submerged) inlet.

Pitot or scoop inlets 10 (see FIGS. 1 and 2) generally exhibit better performance than flush inlets (when used in conjunction with boundary layer diverter 12) and capture more high energy air. Pitot or scoop inlets are advantageous because the boundary layer diverter precludes the ingestion of low momentum flow by the engine. The ingestion of high momentum air translates into improved inlet performance. The main disadvantage of pitot inlets is that the scoop significantly protrudes from the body's Outer Mold Line (OML). These protrusions can have significant effects on aerodynamic drag and moments ($\Delta C_D$ and $\Delta C_M$). In addition, these protrusions can also adversely affect the vehicle's radar cross section.

Flush inlets 20 (see FIGS. 3, 4(a), and 4(b)) include an aperture that is submerged within the general contour of the fuselage and is approached by a long, gently-sloping ramp. Diverging sidewalls on the ramp cut across the streamlines, generating vortices, which energizes the flow.

The present invention combines the best attributes of a pitot (or scoop) inlet of FIGS. 1-2, with the best attributes of a submerged (or flush) type inlet of FIGS. 3-4. The hybrid air intake system retains the advantage of minimal protrusion from the fuselage of a submerged or flush inlet, while exhibiting the improved performance of a pitot or scoop inlet, that captures "clean" (i.e., boundary layer free) free stream air.

BRIEF SUMMARY OF THE INVENTION

The present invention is of a hybrid air intake system and method for air-breathing missiles and aircraft, comprising: providing to an airborne vehicle fuselage an air intake opening comprising at least a pair of side walls and at least an upper wall and a lower wall extending between the side walls, wherein the lower wall extends below a plane defined by the vehicle fuselage; and not employing an offset boundary layer diverter between the fuselage and the upper wall. In the preferred embodiment, the distance between the side walls varies between a forward end and a rearward end of the side walls, most preferably wherein the distance between the side walls increases from the forward end to the rearward end (the rate of increase can be constant or variable). The inlet contraction ratio is higher than possible with an air intake method having a lower wall flush with the plane defined by the vehicle fuselage. The total pressure recovery is higher than possible with an air intake method having a lower wall flush with the plane defined by the vehicle fuselage. The distortion levels are lower than possible with an air intake method having a lower wall flush with the plane defined by the vehicle fuselage. The throat Mach number is lower than possible with an air intake method having a lower wall flush with the plane defined by the vehicle fuselage.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

A hybrid air intake system in accordance with the present invention combines the best attributes of flush (submerged) inlets with the best attributes of pitot (scoop) inlets. The hybrid air intake system reduces the volume consumed by a flush inlet inside the airframe, while improving inlet aerodynamic performance (total pressure recovery and distortion levels), relative to its classical flush counterpart. The hybrid air intake system of the invention increases flush inlet capture and/or throat areas, without encroaching into the vehicle internal (fuel and/or payload) volume, improves inlet aerodynamic performance, retains the advantage of minimal protrusion from the fuselage, and approaches the performance of a scoop inlet.

The hybrid air intake system in accordance with the present invention retains the lower portion of the scoop inlet wall, including the cowl lip protruding from the fuselage. The hybrid air intake system also retains the sloping ramp with divergent sidewalls. These diverging sidewalls cut across the streamlines, setting up a vortex motion which energizes and carries the boundary layer away from the inlet entrance area and into the freestream, essentially acting as a boundary layer diverter. This "boundary layer diverter" is submerged within the general contour of the fuselage, which includes the upper throat area wall and portions of the throat area sidewalls. The complementary portion of the throat geometry protrudes from the fuselage, thus allowing increases in throat area, which reduces the throat Mach number, which in turn reduces aerodynamic losses. Alternatively, the inlet contraction ratio ($A_c/A_t$) can be increased to further improve inlet performance. The hybrid air intake system in accordance with the present invention reduces the volume consumed by the inlet inside the airframe, while improving inlet performance (total pressure recovery and distortion parameters) relative to its classical National Advisory Committee for Aeronautics (NACA) flush inlet counterpart.

Therefore, benefits in vehicle performance (thrust, fuel consumption, hence range) are achieved by two means. First, there is the benefit gained from the improved total pressure recovery and lower distortion levels. And second, there is the added benefit gained from the additional internal volume available to carry fuel.

Figure 1:
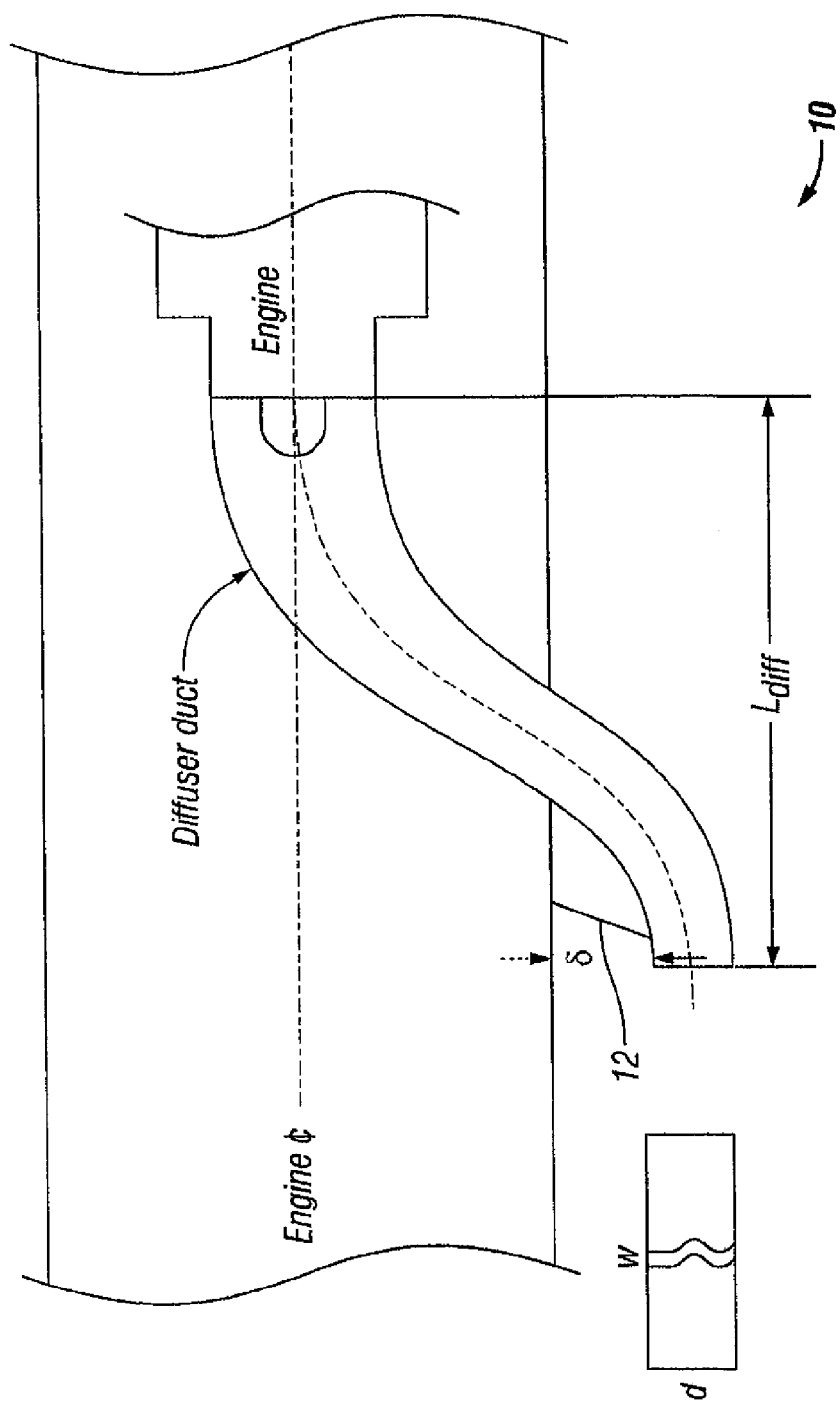
FIG. 1 is a schematic view of a pitot or scoop inlet of the prior art.
Figure 2:
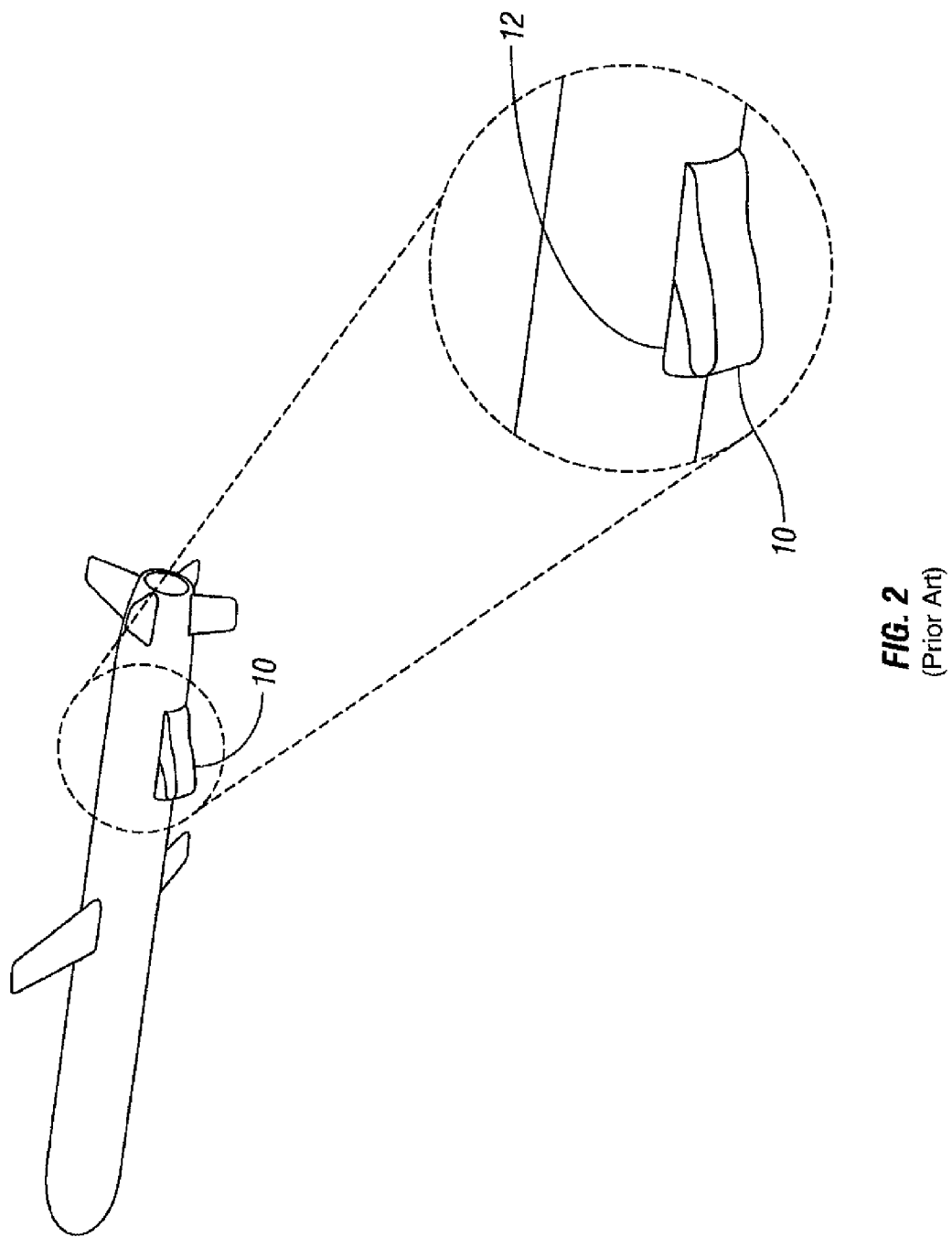
FIG. 2 is a perspective and enlarged perspective view of a pitot or scoop inlet of the prior art.
Figure 3:
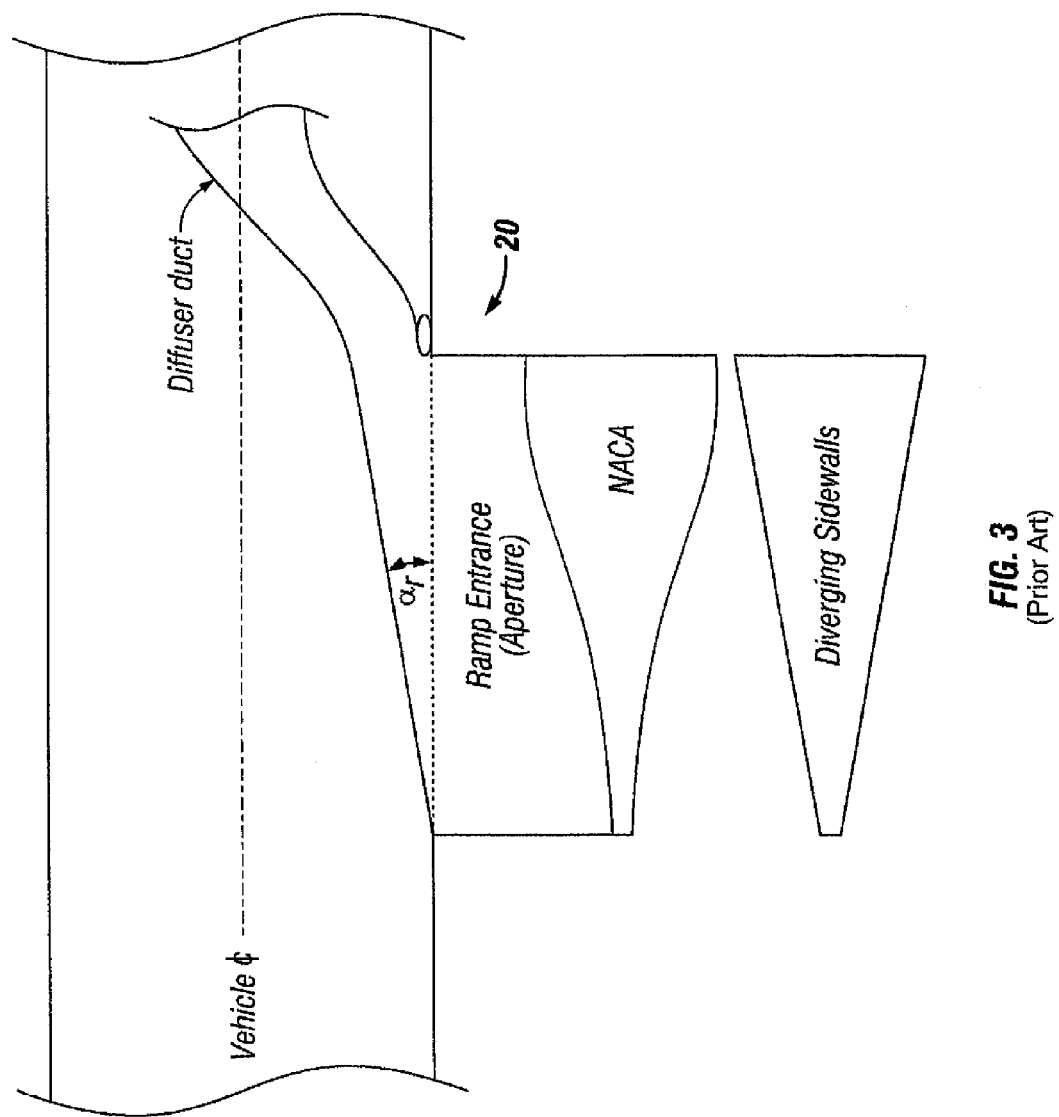
FIG. 3 is a schematic view of a flush or submerged inlet of the prior art.
Figure 4B:
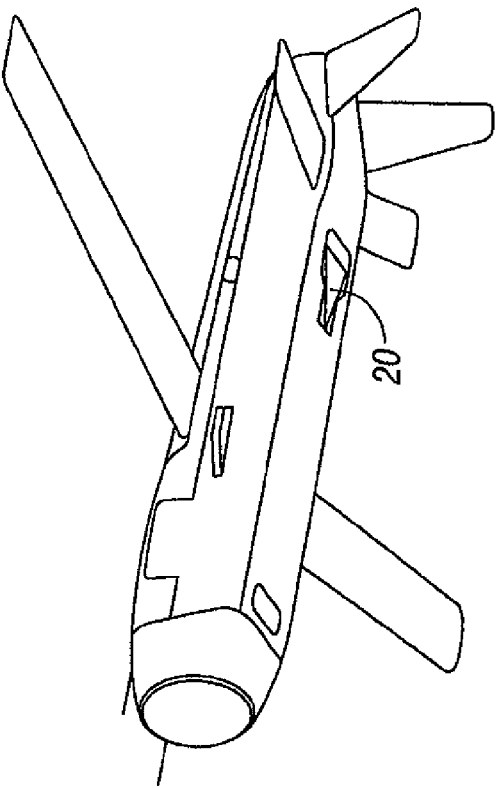
FIG. 4 is a perspective view of a flush and submerged inlet of the prior art.
Figure 4A:
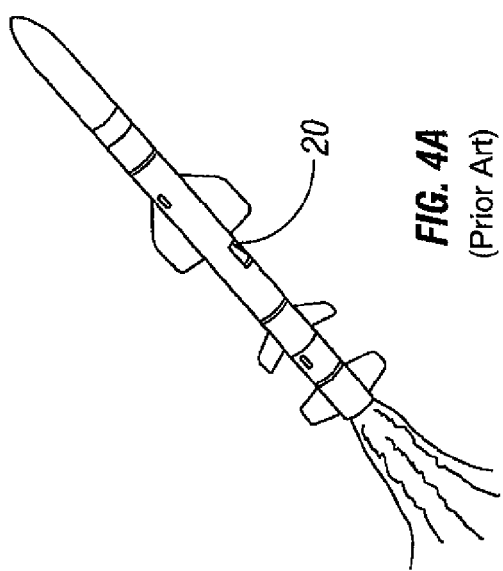

FIG. 1 depicts a sketch of a pitot (scoop) inlet and FIG. 2 depicts a typical pitot inlet in a Tomahawk cruise missile. Similarly, shown in FIG. 3 is a sketch of flush (submerged) inlets (shown with NACA and straight diverging walls types). FIG. 4 depicts typical flush inlets in a Harpoon missile and on a Surveying Miniature Attack Cruise Missile (SMACM).

Pitot inlets, when used in conjunction with a boundary layer diverter, usually yield better performance than their flush counterparts. More high energy air is captured because the boundary layer diverter precludes the ingestion of low momentum boundary layer flow, which translates into improved inlet performance. The main disadvantage of pitot inlets is that the scoop significantly protrudes from the body's Outer Mold Line (OML), as seen in FIGS. 1 and 2. In addition to the external volume consumed by pitot inlets, which is frequently in conflict with packaging constraints, this geometric protrusion has other aerodynamic performance implications, such as additional vehicle aerodynamic drag and moments ($\Delta C_D$ and $\Delta C_M$). Furthermore, if there are Radar Cross Section (RCS) considerations, pitot inlets are inherently inferior to their flush counterparts.

Figure 5:
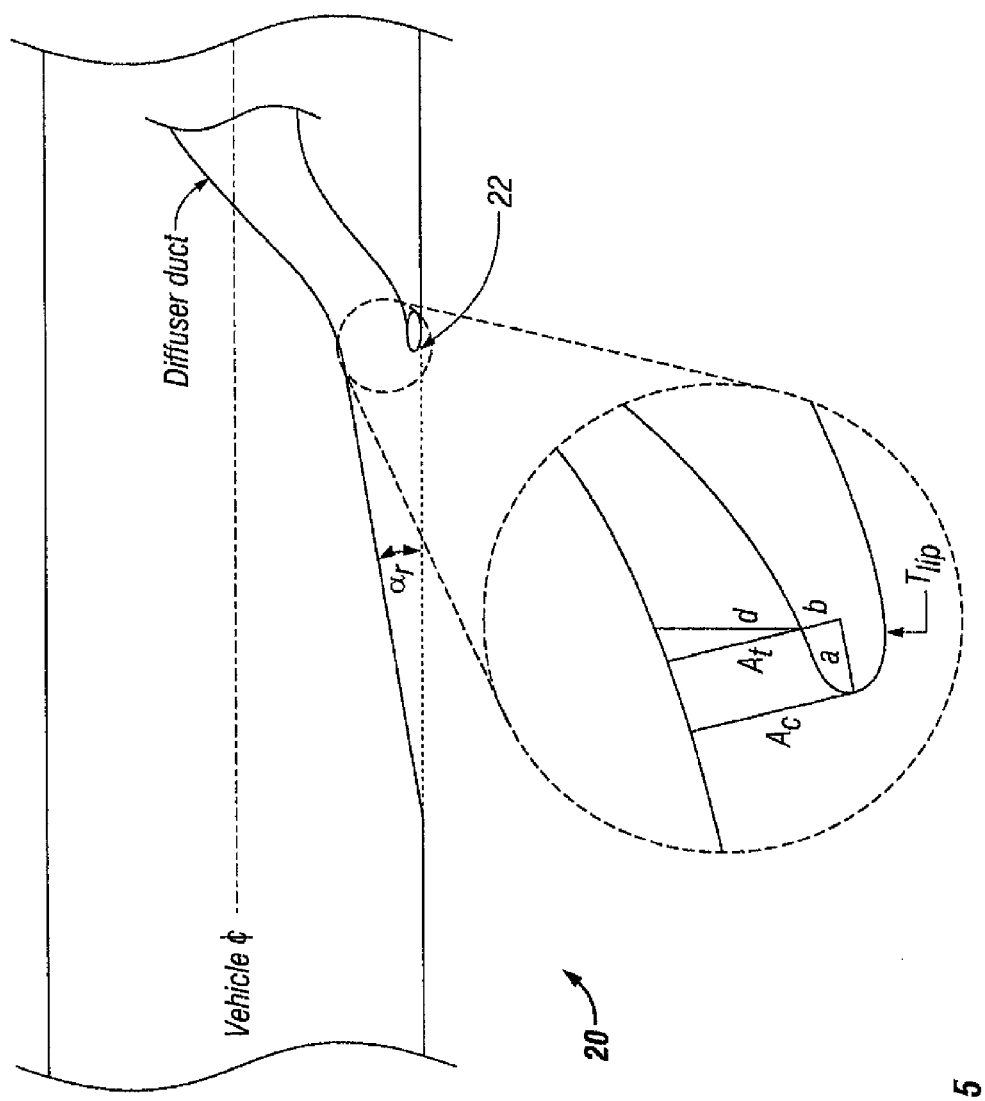
FIG. 5 is a schematic view of a flush or submerged inlet of the prior art.

The flush type subsonic inlet was developed by Frick, Davis, Randall and Mossman in 1945, and although significant numbers of studies have been conducted to characterize this type of inlet, flush inlets have remained virtually unchanged for more than 50 years. Flush inlets, whether the classical NACA type aperture or the straight diverging aperture walls, both work on the same principle. That is, the aperture at one end defined by cowl lip 22 (see FIGS. 3-5) is submerged within the general contour of the fuselage and is approached by a long, gently-sloping ramp. The ramp is narrow at its beginning and has divergent sharp-edged sidewalls that lead to the span wise extremities of the highlight or capture area. These diverging sidewalls cut across the streamlines, setting up a vortex motion which energizes and carries the boundary layer away from the inlet entrance (or highlight) area and into the free stream, essentially acting as a boundary layer diverter.

While other inlet configurations do exist, they do not exhibit the level of aerodynamic performance required by aircraft and missile engines. Consequently, the use of these lower performing inlet configurations is usually limited to auxiliary systems, such as auxiliary power units.

Figure 6:
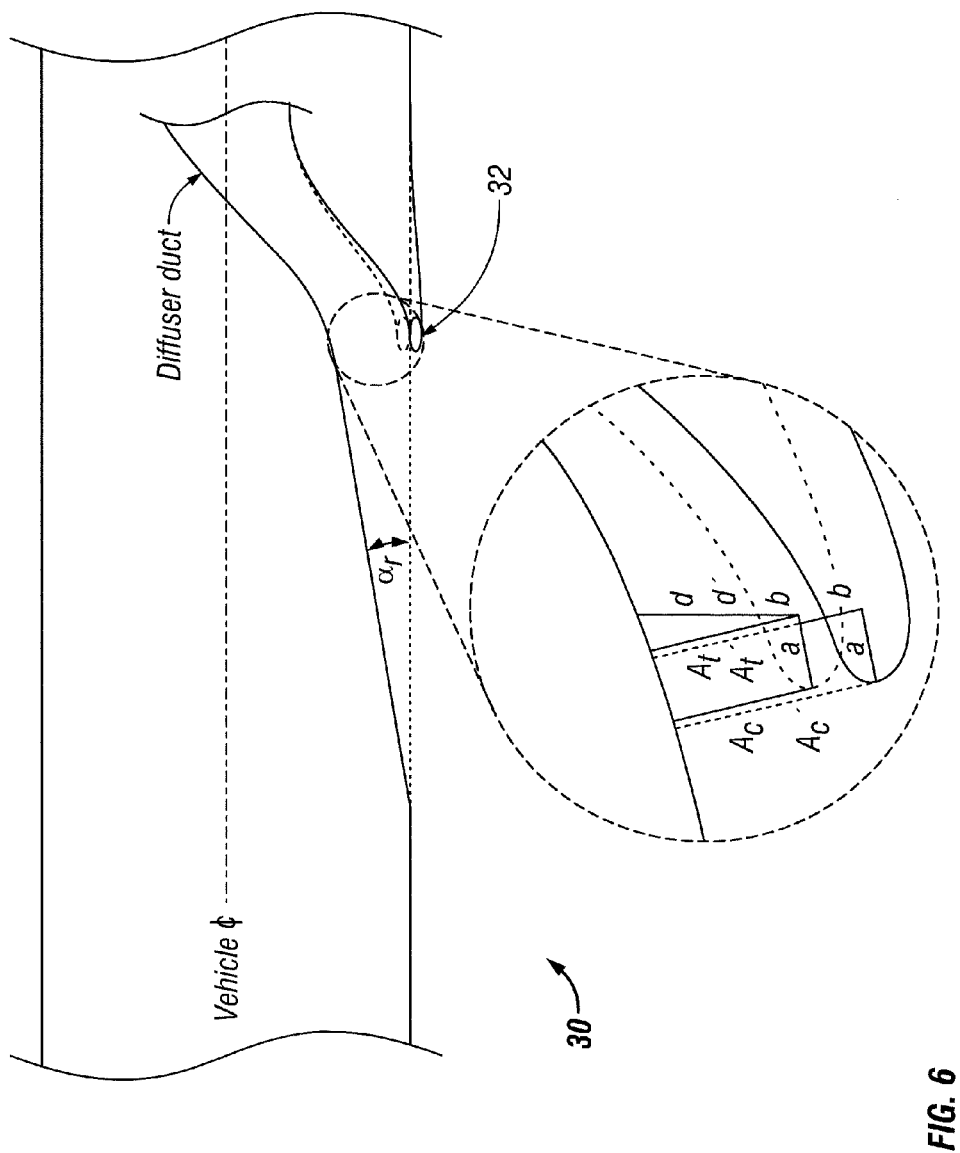
FIG. 6 is a schematic view of a hybrid air intake system in accordance with the present invention.
Figure 7:
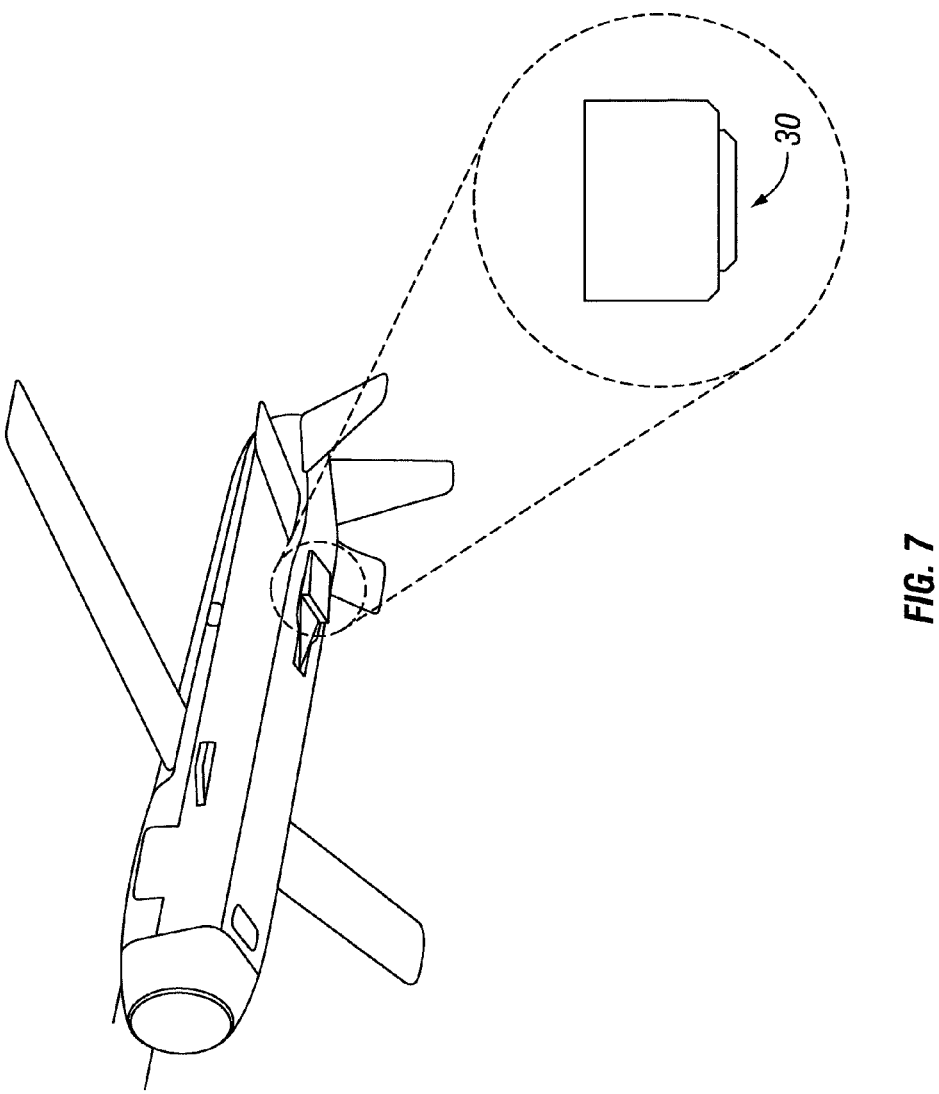
FIG. 7 is a perspective view of a hybrid air intake system in accordance with the present invention.

Referring to FIGS. 6 and 7, the hybrid air intake system 30 in accordance with the present invention combines the best attributes of a pitot (or scoop) inlet of FIGS. 1-2, with the best attributes of a submerged (or flush) type inlet of FIGS. 3-4. The hybrid air intake system retains the advantage of minimal protrusion from the fuselage of a submerged or flush inlet, while exhibiting the improved performance of a pitot or scoop inlet, that captures "clean" (i.e., boundary layer free) free stream air.

This is primarily accomplished by extending/protruding the inlet cowl lip 32 away from the fuselage (see FIG. 6), such that it entraps a greater amount of "clean" air from the free stream. This inlet concept allows the inlet designer to increase the inlet throat area, thereby reducing the throat Mach number; and hence reducing the losses associated with high flows per unit area (W/A); and also permits the inlet contraction ratio ($A_c/A_t$) to be increased, thereby further improving inlet performance.

FIG. 6 illustrates the geometric differences between the classical and the inventive hybrid inlets, showing how the increase in capture and throat areas are realized. FIG. 7 depicts the inventive hybrid inlet incorporated into the SMACM missile. In essence, the hybrid inlet gives inlet designer options previously unavailable. The hybrid air intake system of the present invention allows the inlet analyst the ability to increase the throat and capture areas with minimal volume impacts while improving inlet performance over conventional flush or submerged inlets, and therefore also improving vehicle performance in addition to more efficient packaging, thus allowing for more volume for fuel, payload, and/or electronics.

The hybrid air intake system of the present invention may be utilized for the main power plant or auxiliary power units in subsonic military or commercial aircraft.

The hybrid air intake system of the present invention combines the best attributes of the two existing types of subsonic inlets, thus providing improved packaging characteristics and improved aerodynamic performance, along with the elimination of the costs, weight, and volume associated with deployable pitot (scoop) inlets. The hybrid air intake system advantageously provides performance improvements realized by reductions in internal inlet volume, provides increased fuel and/or payload volume, thus increasing vehicle range and/or mission effectiveness. The hybrid air intake system also provides increases in inlet total pressure recovery ($P_{t_2}/P_{t_0}$), which result in thrust and vehicle range improvements, whereas reductions in distortion (KD2) levels yield improved engine start-up (compressor search) and engine transients characteristics.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A hybrid air intake system for air-breathing missiles and aircraft, said system comprising:
    a fuselage having an axis; and
    an air intake opening in said fuselage comprising at least a pair of side walls and at least an upper wall and a lower wall extending between said side walls, the lower wall comprising a unitary element having a continuous surface that comprises a leading edge, an interior surface and an exterior surface, the leading edge and at least a portion of the interior surface intersecting and extending beyond a line that runs parallel to the axis of the fuselage and extends from a first point on the fuselage at a junction of the fuselage with the air intake opening to a second point on the fuselage behind the leading edge, the lower wall being fixed with respect to the fuselage, wherein a distance between said side walls varies between a forward end and a rearward end of said side walls;
    wherein no offset boundary layer diverter is employed between said fuselage and said upper wall; and
    wherein said air intake system comprises no moving parts.

2. The system of claim 1 wherein said distance between said side walls increases from said forward end to said rearward end.

3. The system of claim 2 wherein said distance between said side walls increases at a constant rate from said forward end to said rearward end.

4. The system of claim 2 wherein said distance between said side walls increases at a variable rate from said forward end to said rearward end.

5. The system of claim 1 wherein said fuselage is a missile fuselage.

6. The system of claim 1, wherein the interior surface forms a concave surface portion and a convex surface portion, the concave surface portion transitioning into the convex surface portion.

7. A hybrid air intake method for an airborne vehicle, the method comprising steps of:
    providing a fuselage having an axis;
    providing to the fuselage an air intake opening comprising at least a pair of side walls and at least an upper wall and a lower wall extending between the side walls, the lower wall comprising a unitary element having a continuous surface that comprises a leading edge, an interior surface and an exterior surface, the leading edge and at least a portion of the interior surface intersecting and extending beyond a line that runs parallel to the axis of the fuselage and extends from a first point on the fuselage at a junction of the fuselage with the air intake opening to a second point on the fuselage behind the leading edge, the lower wall being fixed with respect to the fuselage, wherein a distance between the side walls varies between a forward end and a rearward end of the side walls;
    not employing an offset boundary layer diverter between the fuselage and the upper wall; and
    employing no moving parts on the air intake.

8. The method of claim 7 wherein the distance between the side walls increases from the forward end to the rearward end.

9. The method of claim 8 wherein the distance between the side walls increases at a constant rate from the forward end to the rearward end.

10. The method of claim 8 wherein the distance between the side walls increases at a variable rate from the forward end to the rearward end.

11. The method of claim 7 wherein the airborne vehicle is a missile.

12. The method of claim 7 wherein the airborne vehicle comprises a subsonic air vehicle.

\* \* \* \* \*